Jan. 13, 1959   A. J. LA TORRE   2,868,056
BLIND FASTENER HAVING EXPANSIBLE COIL SPRING HEAD
Filed Oct. 20, 1955
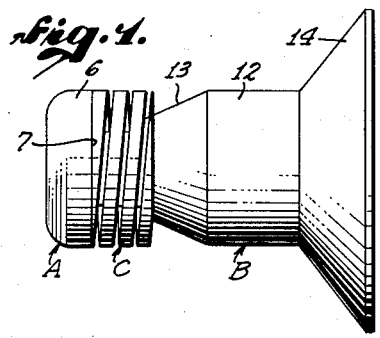
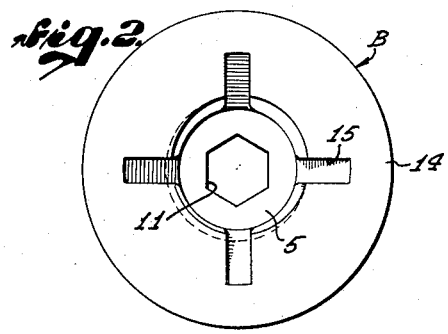
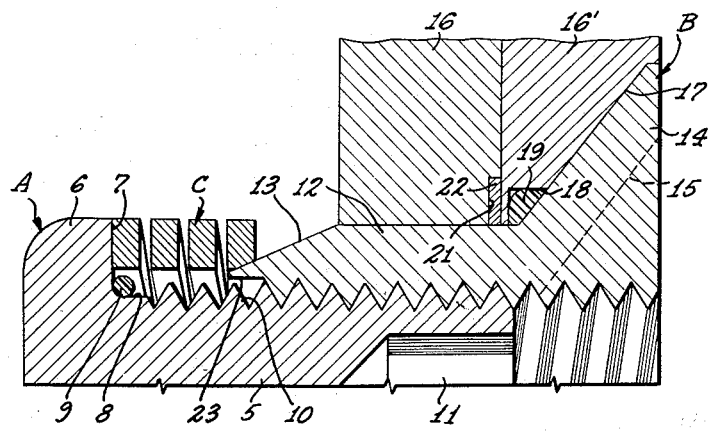
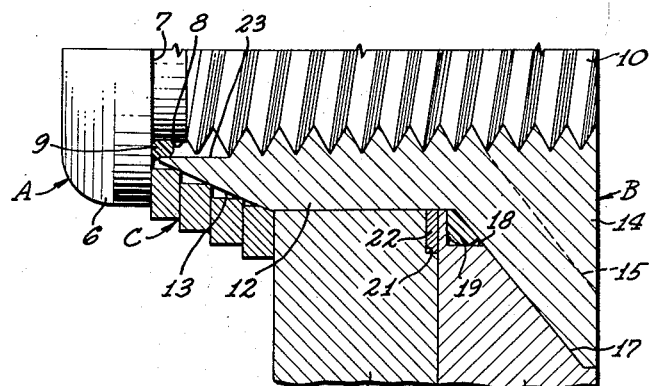
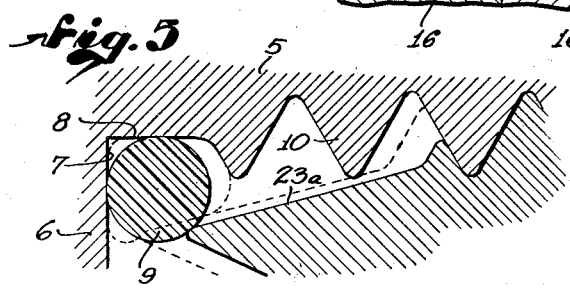
ALBERT J. LA TORRE,
INVENTOR.
BY
ATTORNEY.

United States Patent Office 2,868,056
Patented Jan. 13, 1959

2,868,056

BLIND FASTENER HAVING EXPANSIBLE COIL SPRING HEAD

Albert J. La Torre, Rolling Hills, Calif.

Application October 20, 1955, Serial No. 541,628

6 Claims. (Cl. 85—2.4)

This invention relates to fasteners of the type commonly referred to as a "blind" fastener, characterized generally by the embodiment of a head at one end and at the other end, a shank adapted to be extended through registering openings in plate or sheet members to be secured together, and having provision for manipulation of the fastener at its headed end so as to form a secondary head on the unheaded shank, whereby the two heads may cooperate to clamp between them the apertured members.

The present invention relates particularly to a blind fastener of the bolt and nut type, the above mentioned shank being embodied in the bolt element and the nut being the headed element; and both of these elements, being provided, at the same end of the fastener, with means whereby the two elements may be simultaneously engaged by a driving tool adapted to develop relative rotation of the elements in opposite directions (e. g., as by holding one of the elements stationary while the other element is rotated). In this connection, a specific object of this invention is to provide a blind fastener of the bolt-nut type, embodying wrenching means on both the nut and the bolt element for simultaneous engagement by the nut running tool at one end of the fastener.

The invention deals primarily with the problem of utilizing the operation of advancing the nut element on the bolt element (i. e. of drawing the bolt element into the nut element) to establish a head at the formerly unheaded end of the bolt element. The common means for doing this, heretofore used, is a sleeve of soft metal, capable of being expanded, interposed between a shoulder at the end of the bolt element and a conical expander mandrel at the end of the nut element, the drawing of the two elements together forcing the sleeve over the mandrel so as to stretch the sleeve to a diameter such as to convert it into a head for engaging the blind side of the assembly of parts to be secured together. The diameter of the secondary head thus formed is of course limited by the ability of the sleeve to expand without cracking or becoming otherwise weakened. Also, considerable force must be exerted between the nut and bolt element to stretch the metal of the sleeve to a sufficient diameter to form the head. Furthermore, once the secondary head has thus been formed, the operation is irreversible and the fastener is permanently established in fastening relation and cannot be unfastened except by destroying it.

An important object of the present invention is to eliminate the above mentioned objection. Specifically, the invention aims to provide a blind fastener of the general type outlined above, which can be operated with maximum ease from the accessible side of the work to establish a secondary head at the blind side of the work.

Another object is to provide such a blind fastener which can be unfastened and used over and over again to the same extent that a conventional nut and bolt can be reused.

Another object is to provide such a blind fastener having means for establishing fluid sealing across the apertures in the work members.

Another object is to provide such a blind fastener having maximum high shear strength.

A further object is to provide such a fastener having a high tension pre-loading for locking the fastener against undesirable unthreading movements.

More specifically, the invention aims to provide such a blind fastener having a high resistance to the effect of vibration tending to loosen the fastener.

Another object is to provide such a fastener which can be used in installations where anchor nuts and nut plates are customarily employed, thus eliminating the necessity for permanent attachment of an anchor nut or a nut plate to a work sheet.

Another object is to provide such a blind fastener having means for retaining the fastener in the work (preventing the fastener dropping out of the work) when in an unfastened condition.

Other objects will become apparent in the ensuing specifications and appended drawing in which:

Fig. 1 is a side view of a blind fastener embodying the invention;

Fig. 2 is a head end view thereof;

Fig. 3 is an enlarged, detail, fragmentary axial sectional view of the fastener prior to the fastening operation;

Fig. 4 is a fragmentary enlarged detail axial sectional view of the fastener in fastened condition; and Fig. 5 is an enlarged fragmentary detail sectional view of a modified form of the invention.

Referring now to the drawings in detail, I have shown therein, as an example of one form in which the invention may be embodied, a fastener embodying, as its main components, a bolt element A, a nut element B, and a secondary head element C. Normally, these three elements are assembled in coaxial relation as shown in Fig. 1, with secondary head C contracted to a minimum diameter.

The bolt element A comprises a shank 5 and an abutment flange 6 at one end thereof, defining a radial, annular abutment shoulder 7 for engagement against the secondary head element C. Immediately adjacent abutment shoulder 7, shank 5 has an unthreaded portion defining a cylindrical seat 8 for a lock ring 9. The remainder of shank 5 is provided with an external thread 10. In the opposite end of shank 5 is a wrenching recess 11 which may be hexagonal, as shown in Fig. 2, or may be of any other selected non-cylindrical cross section so as to interlock with correspondingly shaped wrenching elements on a driving tool. Alternatively, shank 5 may have a projecting stem with external wrenching surfaces.

Nut B includes a cylindrical body portion 12, a conical mandrel tip 13 at one end thereof, and a head 14 which may be of the countersunk type shown, or any other conventional type—hexagonal, flat-round, fillister, etc., having suitable wrenching surfaces either external, or internal, such as the cross recesses 15.

Nut B is receivable through aligned apertures in a pair of sheets or plates 16, 16' to be secured together, the latter having a suitable countersink 17 to receive head 14 where the latter is of the countersunk type. At the base of countersink 17 is a counterbore 18 to receive a gasket 19, which may be of the O-ring type. In the inner face of plate 16 is a shallow flat counterbore 21 which receives a hardened split washer 22 in frictional gripping engagement with nut body 12 to retain the nut in plate 16' when bolt element A is removed.

Nut 12, at its end opposite from head 14, is formed within frustoconical mandrel tip 13, with a counterbore 23 just slightly larger in diameter than the tips of threads 10 and adapted to receive lock ring 9 to establish a lock and seal between shank A and nut B to resist unthreading when the shank has been drawn fully into the nut. Lock ring 9 has a cross-sectional diameter slightly greater than the radial spacing between shoulder 8 and counterbore 23 so as to be received therebetween with an interference fit and placed under compression so as to inhibit unthreading movement.

Secondary head element C consists in a coil spring of flat, rectangular section wire, wound with its major cross sectional dimension disposed radially.

The element C is of spring material, highly elastic so as to yieldingly resist expansion with a force which maintains it in tightly hugging contact with the conical face of mandrel 13. The taper of mandrel 13 is sufficiently low in relation to the radial width of element C in cross section, so that there is substantial radial overlap as between the turns of element C. The areas of shoulder 7 and of plate 16 which engage the end turns, of course do not have radial overlap with respect to one another. However, the couple, or turning moment thus applied to the turns of element C tending to twist them out of their flat helix configuration into coned configuration, is adequately resisted by several forces including (a) the inherent resistance of the turns of element C to being thus deformed (b) the clamping action in which the end turns are clamped between adjacent turns and the shoulder 7 and plate 16 respectively, through a majority of their lateral face area, and the intermediate turns are similarly clamped between the end turns and against one another, and (c) the bearing of the inner edges of the turns against mandrel 13. The inner diameter of element C may be slightly greater or less than the minimum diameter of the frusto conical outer face of mandrel 13. Preferably, its inner diameter is just slightly greater than the outer diameter of thread 10, so that the cross section of element C may have maximum radial width, thus providing for maximum overlap of the turns of the coil spring when expanded, with resulting maximum compressive load-holding capacity. Also, the maximum-width spring section has maximum contractile force for hugging mandrel tip 13. To insure entry of tip 13 into element C when the latter is fully contracted, the end turn facing tip 13 is provided with a frusto-conical counterbore as shown, to receive tip 13.

Counterbore 23 is preferably conical as shown at 23a in Fig. 5, so as to effect a squeezing action against ring 9 as nut B is advanced as indicated by the dotted lines in Fig. 5.

Lock ring 9 and gasket 19 are of dense though compressible material. Hard fiber, nylon, rubber, etc., are suitable.

In using the fastener, it is first assembled as shown in Fig. 1. The outer diameter of secondary head C, in this unexpanded condition, is the same as that of nut body 12 (at its cylindrical outer wall). The assembled fastener is inserted through the registering openings in plates 16, 16', the assembly of parts then being as shown in Fig. 3.

A suitable driving tool (or tools) is then applied to socket 11 of bolt A and to recesses 15 of nut B, and is operated to effect relative rotation between elements A and B (as by holding one of them stationary while the other is rotated). The relative rotation is in a direction to draw shank A into nut B, and is continued until the axial clearance between the turns of auxiliary head element C is taken up by compression, and the element C is tightly clamped between driving shoulder 7 and plate 16, as shown in Fig. 4.

As the elements A and B are drawn together, element C will be forced onto mandrel 13 and will be thereby expanded to the frusto-conical configuration shown in Fig. 4, its expanded end having assumed a diameter such that it is disposed largely outwardly of the diameter of the openings in plates 16, 16' and in full face contact with plate 16 around the opening therein, whereas in its original unexpanded condition it is disposed entirely within the diameter of the openings so as to freely pass therethrough.

In the fully set positions of the parts, lock ring 9 has been forced by shoulder 7 into the constricted annular space between cylindrical shoulder 8 and counterbore 23 of mandrel tip 13. Because of the greater cross sectional diameter of lock ring 9 than the radius of the receiving space, ring 9 becomes flattened between shoulder 8 and the wall of counterbore 23. Ring 9, under compression, will exert a strong pressure and frictional grip against shoulder 8 and mandrel tip 13, throughout the full circumference of the fastener, thereby locking the nut element B to shank element A in a manner to effectively resist unthreading under the effect of vibration, etc., in usage. At the same time, by applying adequate torque between elements A and B in the unthreading direction, it is possible to remove the fastener without damaging its parts, although normally a new lock ring 9 will be used when the fastener is again installed.

In the removal operation, as the shank A is backed out of nut B, element C will, by its elastic contraction, effect a camming action against the conical face of mandrel 13, causing it to follow shoulder 7 and resume its normal form shown in Fig. 3. At the same time, by pulling nut B outwardly from plate 16' as permitted by the backing away from shank A, the restraint of element C by its abutting engagement with plate 16 can be utilized to assist the element C in sliding off mandrel 13.

A very important advantage of the invention, and a great improvement over the prior art, arises from the extremely high axial compressive load carrying strength of the spring when the turns thereof are brought into solid bearing engagement with one another. The spring then comes in effect a solid stepped cone, with a compressive load resistance many times higher than that of the expanded sleeve of a conventional blind fastener of the prior art type referred to above. The conventional fastener sleeve is necessarily of a material soft enough to be stretched over the expander mandrel of the fastener, and correspondingly is of such softness even after the work hardening that takes place in the expansion thereof, so that it can continue to deform under axial loading after it has been set up tight. In contrast, the present invention utilizes a hard spring material capable of resisting compression loading up to 150,000 p. s. i., and for all practical uses, the auxiliary head when compressed to the solid state, is completely unyielding in its resistance to any compression loading to which it may be subjected in ordinary usage. Furthermore, the conventional sleeve tends to buckle away from the expander cone as it is subjected to compression of a blind fastener, thus departing from a true conical shape and seriously weakening its capacity for resisting axial loading. The coil spring structure of the present invention will not do this, each turn of the coil spring having its own contractual force which maintains it in tight engagement with the expander mandrel and, when the several turns are clamped together, each coil assisting an adjacent coil in resisting radial expansion. Also, the auxiliary head of this invention, because of its coil spring nature and the resultant ready yield-ability to radial expansion prior to the clamping action of final setting, may have and does have a radial wall thickness several times that which is possible in a solid sleeve that must be actually stretched in its wall structure. Thus, when the auxiliary head of this invention is clamped tightly against the work, it not only has a much higher intrinsic hardness and compression resistance factor, but also has a wall thickness several times that of the conventional sleeve, thus attaining the extremely high compression load resistance.

I claim:

1. In a blind fastener: a bolt element including a shank having a male thread, wrenching means at one end thereof, and head means providing a radial driving shoulder at the other end thereof; a nut element threaded onto said shank, including an intermediate tubular body having a cylindrical outer wall and a female thread for meshing with the thread of said shank, a conical mandrel at one end thereof, opposed to said driving shoulder, and a head at the other end thereof adjacent said wrenching means; and an auxiliary head element axially interposed between said driving shoulder and said mandrel, in the form of a coil spring comprising turns of rectangular cross section having a greater radial dimension than axial thickness, said turns being normally axially spaced, said coil spring having, in an end turn thereof adjacent said nut element, a frusto-conical counterbore receiving the tip of said mandrel and positioning said coil spring in coaxial relation to said bolt and nut element and said coil spring being normally of cylindrical overall configuration and having an inner diameter slightly larger than the maximum diameter of said male thread; said head means and coil spring and said cylindrical outer wall of the nut element, in a loose assembly of said parts, having a common outer diameter whereby said loose assembly may be freely inserted through registering openings slightly larger than said diameter in work sheets to be secured together; said auxiliary head element being adapted, as the result of advancing threading movement of said bolt into said nut, to be driven by said driving shoulder against said mandrel and thereby expanded into frusto-conical form, and finally having its turns closed upon one another by compression between the adjacent work sheet and said driving shoulder, with an end turn of maximum diameter engaging the adjacent work sheet outside the diameter of said opening, with an opposite end turn of minimum diameter abutting said driving shoulder, and with an intermediate portion of intermediate diameter engaged between said end turns in stepped relation thereto and the entire auxiliary head providing an end load transmitting abutment between said head means and said adjacent work sheet.

2. A blind fastener as defined in claim 1, wherein the ratio between the radial width and the axial thickness of the cross section of said coil spring is sufficiently large so that the turns of the coil springs, in the fully expanded auxiliary head, will overlap one another to the extent of between two thirds and three quarters of the dimension of said radial width, whereby to provide secure load transmitting connections between the turns of said auxiliary head.

3. In a blind fastener: a bolt element including a shank having a male thread, wrenching means at one end thereof, and head means providing a radial driving shoulder at the other end thereof; a nut element threaded onto said shank, including an intermediate tubular body having a cylindrical outer wall and a female thread for meshing with the thread of said shank, a conical mandrel at one end thereof, opposed to said driving shoulder, and a head at the other end thereof adjacent said wrenching means; and an auxiliary head element axially interposed between said driving shoulder and said mandrel, in the form of a coil spring embodying turns of rectangular cross section having a greater radial dimension than axial thickness, said turns being normally axially spaced, said coil spring being normally of cylindrical overall configuration and having an inner diameter slightly larger than the maximum diameter of said male thread; said head means and coil spring and said cylindrical outer wall of the nut element, in a loose assembly of said parts, having a common outer diameter whereby said loose assembly may be freely inserted through registering openings slightly larger than said diameter in work sheets to be secured together; said auxiliary head element being adapted, as the result of advancing threading movement of said bolt into said nut, to be driven by said driving shoulder against said mandrel and thereby expanded into frusto conical form, and finally having its turns closed upon one another by compression between the adjacent work sheet and said driving shoulder, with an end turn of maximum diameter engaging the adjacent work sheet outside the diameter of said opening, with an opposite end turn of minimum diameter abutting said driving shoulder, and with an intermediate portion of intermediate diameter engaged between said end turns in stepped relation thereto and the entire auxiliary head providing an end load transmitting abutment between said head means and said adjacent work sheet.

4. A blind fastener as defined in claim 3, including a split washer of spring material encircling and frictionally gripping said intermediate tubular body and adapted to be accommodated in a counterbore in one of said sheets at the plane of contact between the two sheets.

5. A blind fastener as defined in claim 3, wherein said mandrel has an unthreaded counterbore at its tip and said shank has an unthreaded cylindrical seat adapted to be received in said counterbore with an annular space defined therebetween; and including a locking ring of relatively tough, hard, slightly compressible material mounted on said seat and adapted to be engaged under compression between said seat and the wall of said counterbore when the bolt element is drawn into the nut element, thereby to establish a lock between said bolt and nut element resisting unthreading movement thereof.

6. In a blind fastener: a bolt element including a shank having a male thread, wrenching means at one end thereof, and head means providing a radial driving shoulder at the other end thereof; a nut element threaded onto said shank, including an intermediate tubular body having a cylindrical outer wall and a female thread for mesh with the thread of said shank, a conical mandrel at one end thereof, opposed to said driving shoulder, and a head at the other end thereof adjacent said wrenching means; and an auxiliary head element axially interposed between said driving shoulder and said mandrel, in the form of a coil spring embodying turns each of rectangular cross section having a radial width approximately twice its axial thickness said coil spring being normally of cylindrical overall configuration and having an inner diameter slightly larger than the maximum diameter of said male thread; said head means and coil spring and said cylindrical outer wall of the nut element, in a loose assembly of said parts, having a common outer diameter whereby said loose assembly may be freely inserted through registering openings slightly larger than said diameter in work sheets to be secured together; said auxiliary head element being adapted, as the result of advancing threading movement of said bolt into said nut, to be driven by said driving shoulder against said mandrel and thereby expanded into frusto conical form, and finally having its turns closed upon one another by compression between the adjacent work sheet and said driving shoulder with an end turn of maximum diameter engaging the adjacent work sheet outside the diameter of said opening, with an opposite end turn of minimum diameter abutting said driving shoulder, and with an intermediate portion of intermediate diameter engaged between said end turns in stepped relation thereto and the entire auxiliary head providing an end load transmitting abutment between said head means and said adjacent work sheet.

References Cited in the file of this patent

UNITED STATES PATENTS

| | | |
|---|---|---|
| 2,605,315 | Hargett | July 29, 1952 |
| 2,632,354 | Black | Mar. 24, 1953 |
| 2,649,830 | Arnold | Aug. 25, 1953 |
| 2,787,185 | Rea | Apr. 2, 1957 |

FOREIGN PATENTS

| | | |
|---|---|---|
| 79,321 | Norway | Nov. 5, 1951 |